(12) United States Patent
Feng et al.

(10) Patent No.: US 7,931,365 B2
(45) Date of Patent: Apr. 26, 2011

(54) REPLACEABLE-LENS EYEWEAR AND KIT

(75) Inventors: Chen Yu Feng, Zhejiang (CN); Ward Chen, Pomona, CA (US)

(73) Assignee: Jay-Y Enterprise Co., Inc., Pomona, CA (US)

( * ) Notice: Subject to any disclaimer, the term of this patent is extended or adjusted under 35 U.S.C. 154(b) by 0 days.

(21) Appl. No.: 12/535,362

(22) Filed: Aug. 4, 2009

(65) Prior Publication Data
US 2011/0032471 A1    Feb. 10, 2011

(51) Int. Cl.
*G02C 1/00*    (2006.01)
(52) U.S. Cl. .......................... 351/86; 351/103; 351/106
(58) Field of Classification Search .................. 351/41, 351/44, 63, 83–86, 103–109, 154, 178
See application file for complete search history.

(56) References Cited

U.S. PATENT DOCUMENTS

| | | | |
|---|---|---|---|
| 6,059,409 A * | 5/2000 | Sheldon | 351/106 |
| 6,074,059 A | 6/2000 | Glass et al. | |
| 6,086,199 A | 7/2000 | Holland et al. | |
| 6,325,506 B1 | 12/2001 | Cooper | |
| RE37,523 E | 1/2002 | Bondet | |
| 6,340,226 B1 | 1/2002 | Akaba et al. | |
| 6,428,165 B1 | 8/2002 | Rivera | |
| 6,533,412 B1 | 3/2003 | Wang et al. | |
| 6,550,912 B2 | 4/2003 | Vitaloni | |
| 6,592,220 B1 | 7/2003 | Cheong | |
| 6,601,954 B2 | 8/2003 | Menon | |
| 6,709,098 B1 * | 3/2004 | Wang Lee | 351/86 |
| 6,709,099 B2 | 3/2004 | Rivera | |
| 6,712,465 B1 | 3/2004 | Teng | |
| 6,786,592 B2 | 9/2004 | Rivera | |
| 6,863,032 B2 | 3/2005 | Di Lullo et al. | |
| 6,926,404 B2 | 8/2005 | Bassahon et al. | |
| 6,959,988 B1 | 11/2005 | Sheldon | |
| 6,969,172 B2 | 11/2005 | Actis-Datta | |
| 6,991,333 B2 | 1/2006 | Van Atta et al. | |
| 7,118,209 B1 * | 10/2006 | Wang Lee | 351/86 |
| 7,222,958 B1 | 5/2007 | Chiou | |
| 7,249,842 B2 | 7/2007 | Conrad et al. | |
| 7,370,961 B2 | 5/2008 | Lerner et al. | |
| 7,510,279 B2 | 3/2009 | Van Atta et al. | |

\* cited by examiner

*Primary Examiner* — Huy K Mai
(74) *Attorney, Agent, or Firm* — Overhauser Law Offices LLC

(57) ABSTRACT

Eyewear having replaceable lenses, with an illustrative embodiment including a frame, two temples, temple-connecting members extending outwardly from opposing ends of the frame and affixing the temples to the frame; a nose bridge; bridge-connecting members extending outwardly from two points centrally located on the frame and affixing the nose bridge to the frame; nose pads; and a plurality of interchangeable lenses. The lenses, which may be sunglass lenses, are composed of somewhat pliable material and have a perimeter defining at least two collinear recesses, with the recesses capable of selectively and releasably coupling with the temple-connecting members and the nose bridge-connecting members, thus securing the lenses to the frame. A case with a padded interior and fitted storage recesses is used to protect eyewear and lenses not in use.

12 Claims, 3 Drawing Sheets

REPLACEABLE-LENS EYEWEAR AND KIT

FIELD OF THE INVENTION

The present disclosure relates to eyewear and, more particularly, to sunglasses with lenses that are effortlessly replaceable and interchangeable.

BACKGROUND

The importance of wearing protective eyewear when one is exposed to sunlight is well-documented. Filtering bright light and protecting the eyes from dangerous ultraviolet (UV) rays, which can lead to short-term and long-term health problems such as cataracts and macular degeneration, or even skin cancer around the eyelids, there is no denying that sunglasses serve an extremely important purpose.

Moreover, for the style-conscious consumer, eyewear is a true fashion accessory, and coordinating one's sunglasses with the color of a particular clothing outfit is quite desirable. Prior to the development of replaceable-lens eyewear, this required procuring multiple pairs of sunglasses.

Replacing lenses in traditional eyewear typically requires a specialty screwdriver, a deft touch, and an investment of time, as the lenses are held in position in the frame by small threaded screws. Various newer devices provide eyeglasses with replaceable-lens capability through means such as a frame with slits or one point for lens coupling. However, such devices do not provide the durability required for extended wear, with a significant risk of the lenses falling out of the frame. Other devices include tedious locking steps and require more than a modicum of time to insert or remove the replaceable lenses from the frame.

SUMMARY OF THE INVENTION

The present invention may comprise one or more of the following features and combinations thereof.

An illustrative kit of interchangeable, pliable lenses, each having at least two collinear recesses, and an eyewear frame, including two temples, a nose bridge, two nose pads, and at least four connecting members extending outwardly from the frame and respectively affixing the temples and nose bridge to the frame. The frame generally defines a half oval or semicircle. In this embodiment, the connecting members provide a plurality of mounts, with the lens recesses capable of releasably engaging the connecting members and quickly securing the lenses to the frame. The eyewear may be sunglasses. In addition, one or more frames and a plurality of lenses in a variety of sunglass colors may be packaged and protected by a padded case having storage recesses sized for frames and lenses.

Advantageously, extremely little effort is required to change the lenses in the illustrative device. A slight amount of lateral pressure applied to the recess sides of the lenses allows the lenses to be positioned between the connecting members, and the lenses slip into place when the pressure is released, with further movement being prevented by the connecting members.

Although an illustrative embodiment is configured for non-prescription lenses, other embodiments may employ prescription lenses.

Additional features of the disclosure will become apparent to individuals skilled in the art upon consideration of the following detailed description of the illustrative embodiment.

BRIEF DESCRIPTION OF THE DRAWINGS

The detailed description particularly refers to the accompanying figures in which.

DETAILED DESCRIPTION OF THE ILLUSTRATIVE EMBODIMENTS

Figure 1:
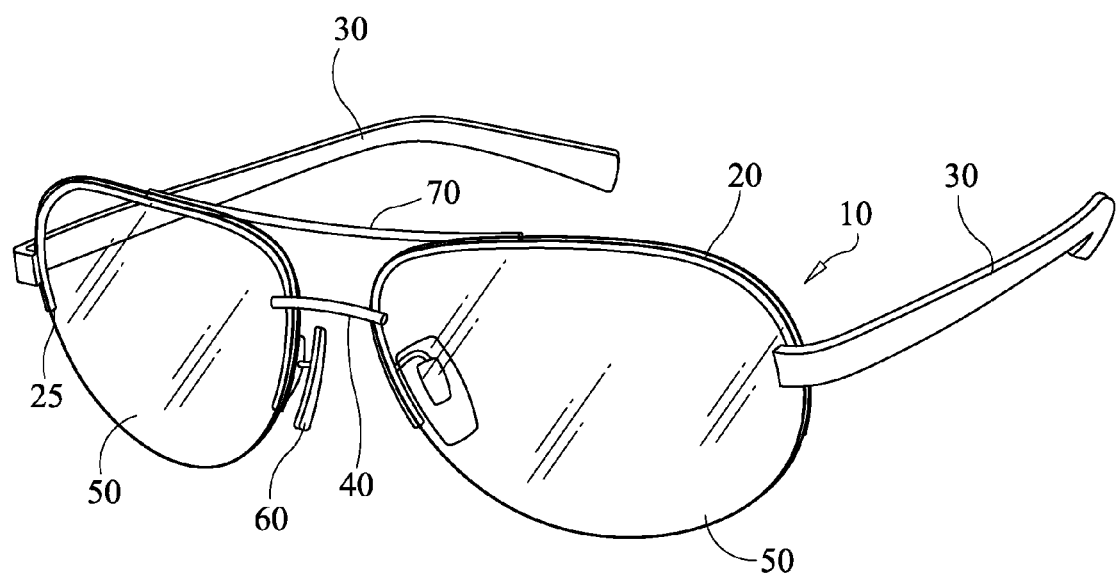
FIG. 1 is a perspective view of a first illustrative embodiment of eyewear with replaceable lenses.

For the purposes of promoting and understanding the principles of the invention, reference will now be made to one or more embodiments illustrated in the drawings and specific language will be used to describe the same.

Figure 2:
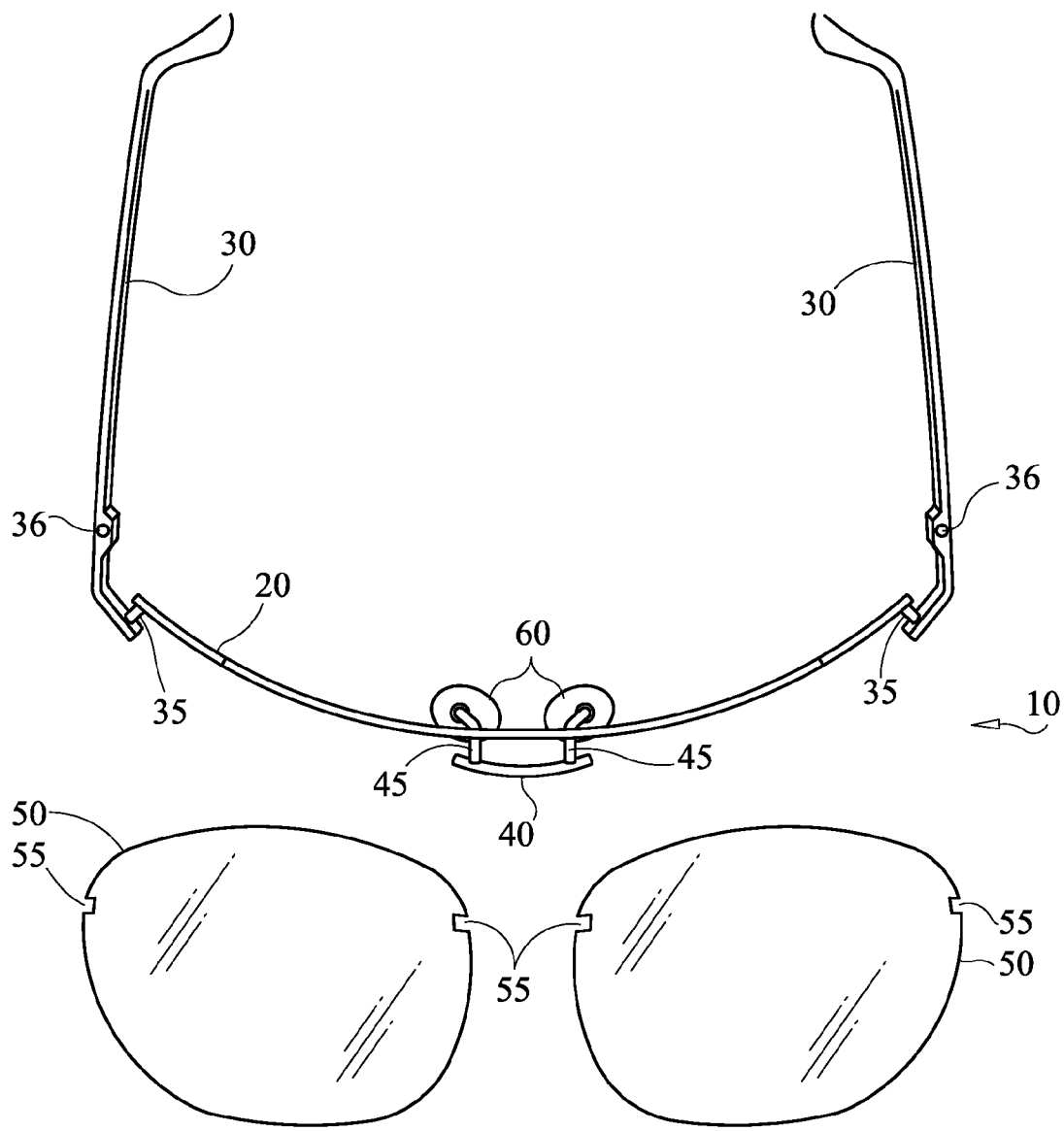
FIG. 2 is an exploded view of the eyewear and replaceable lenses of FIG. 1.

Referring to FIGS. 1 and 2, a first illustrative embodiment of eyewear 10 with replaceable lenses is shown. The eyewear 10 consists of a frame 20; two temples 30; temple-connecting members 35 that extend outwardly from opposing ends of the frame 20 and affix the temples 30 to the frame 20; a nose bridge 40; nose bridge-connecting members 45 that extend outwardly from two points centrally located on the frame and affix the nose bridge 40 to the frame 20; and a plurality of interchangeable lenses 50, each of the lenses 50 being made of pliable material and having a perimeter defining at least two recesses 55.

In one embodiment, the frame 20 has a perimeter generally defining two semi-circles or half ovals 25 along its vertical axis, corresponding in location to the eyes of a wearer. Alternatively, the frame 20 could be implemented as full circles or ovals or full or half rectangles. The frame 20 may be inwardly curved along its horizontal axis, to more closely align with the natural curvature of the head of the wearer. At each of two opposing points corresponding to the nose of the wearer, the frame 20 includes a silicone nose pad 60 of the type standard in the eyewear art and adaptable to the comfort of the wearer. A generally horizontal bar 70 may connect the tops of the semi-circles or half ovals 25 for structural stability.

The two temples 30 provide sides for the eyewear 10 and include curvature, and possibly separate plastic caps, for comfortably fitting around the ears of the wearer. The temples 30 are secured to the frame 20 and retained thereto by the temple-connecting members 35. The longitudinal ends of the temples 30 closest to the frame 20 may have a curvature to meet the longitudinal ends of the temple-connecting members 35 which are opposite the frame 20. The temples 30 also each include a hinge 36, or other bearing mechanism with a limited angle of rotation, to allow the eyewear 10 to be folded when not being worn.

Spanning the nose of the wearer, the nose bridge 40 adds support to the eyewear 10 by connecting the semi-circles or half ovals 25 of the frame 20. The nose bridge 40 is secured to the frame 20 and retained thereto by the nose bridge-connecting members 45.

In the first illustrative embodiment, as shown in FIGS. 1 and 2, the lenses 50 are secured to the frame 20 and retained thereto by virtue of their recesses 55 selectively and releasably engaging and snugly coupling with the temple-connecting members 35 and the nose bridge-connecting members 45.

In the illustrative embodiment, both the temple-connecting members 35 and the nose bridge-connecting members 45 are positioned orthogonally to the frame 20, projecting outwardly therefrom, away from the wearer of the eyewear 10. In particular, the temple-connecting members 35 are located at opposite ends of the frame 20, while the nose bridge-connecting members 45 are located at generally central points on the frame 20. Other locations of both types of connecting members are contemplated.

Utilizing temple-connecting members 35 and nose bridge-connecting members 45 of various lengths will make possible the installation of lenses 50 of various thickness, including those of the prescription variety.

The frame 20 in the illustrative embodiment is metallic in composition. It is conceived that the frame 20 may be made of a variety of materials, including titanium, stainless steel, or plastic. As indicated, the frame 20 may be formed in a variety of shapes so long as outwardly-extending temple-connecting members 35 and outwardly-extending nose bridge-connecting members 45 are included for securing the lenses 50.

In an illustrative embodiment, the interchangeable lenses 50 are composed of a synthetic solid material which is somewhat pliable and transparent, namely, a lightweight plastic polymer such as acrylic, polycarbonate or CR-39 (allyl diglycol carbonate). It is conceived that the lenses 50 may be manufactured from any semi-rigid material capable of transmitting light without scattering it. The lenses 50, in one embodiment, may be marketed as a kit consisting of at least one set of eyewear 10 and a plurality of lenses 50 in different shades of color or tints to give the wearer the opportunity to customize his or her appearance.

Figure 3:
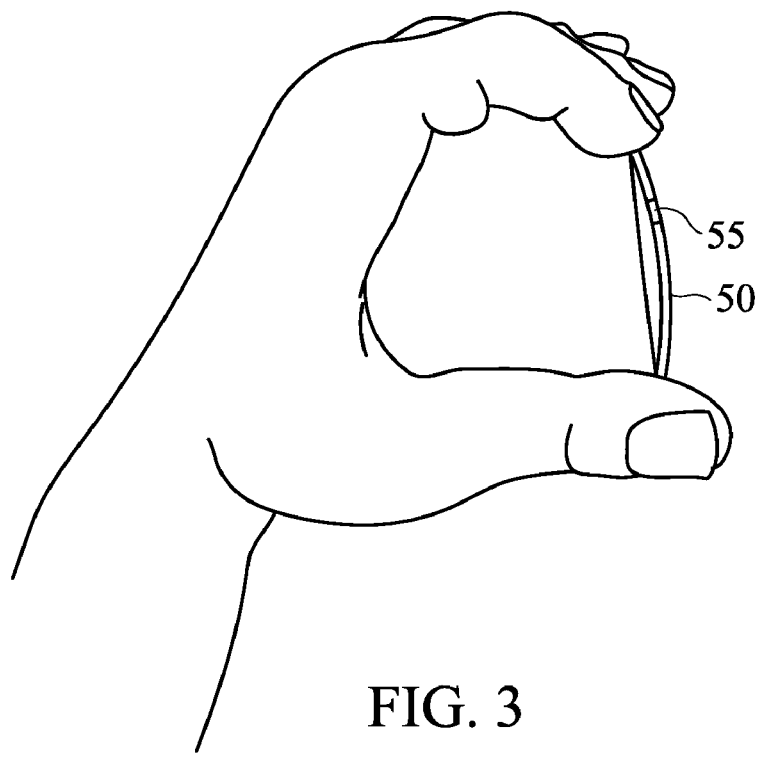
FIG. 3 is a perspective view of one of the replaceable lenses of FIG. 1 having lateral pressure applied to it according to the present disclosure.

FIG. 3 illustrates that the pliability of the lenses 50 is such that they are capable of slightly bending, only enough for them to fit between the temple-connecting members 35 and the nose bridge-connecting members 45 for insertion into the frame 20.

The lenses 50 are substantially planar in shape, with minor side-to-side curvature along both their horizontal and vertical axes in a form very typical of eyewear lenses. The design of the lenses 50 may be such that, once inserted, they align with the top of the frame 20, but this is not required to practice the invention. The lenses 50 may be polarized for glare reduction or mirror coated to decrease the amount of light passing through them.

In the illustrated embodiment, the lens recesses 55 are collinear. The perimeter of each of the lenses 50 may define more than two recesses 55, but, for any given lens, at least one of the recesses 55 must be capable of coupling with a temple-connecting member 35 and another recess 55 must be capable of simultaneously coupling with a nose bridge-connecting member 45. The shape of the recesses 55 includes right angles in one embodiment, but may vary so long as the recesses 55 are capable of coupling with the temple-connecting members 35 and nose bridge-connecting members 45.

Figure 4:
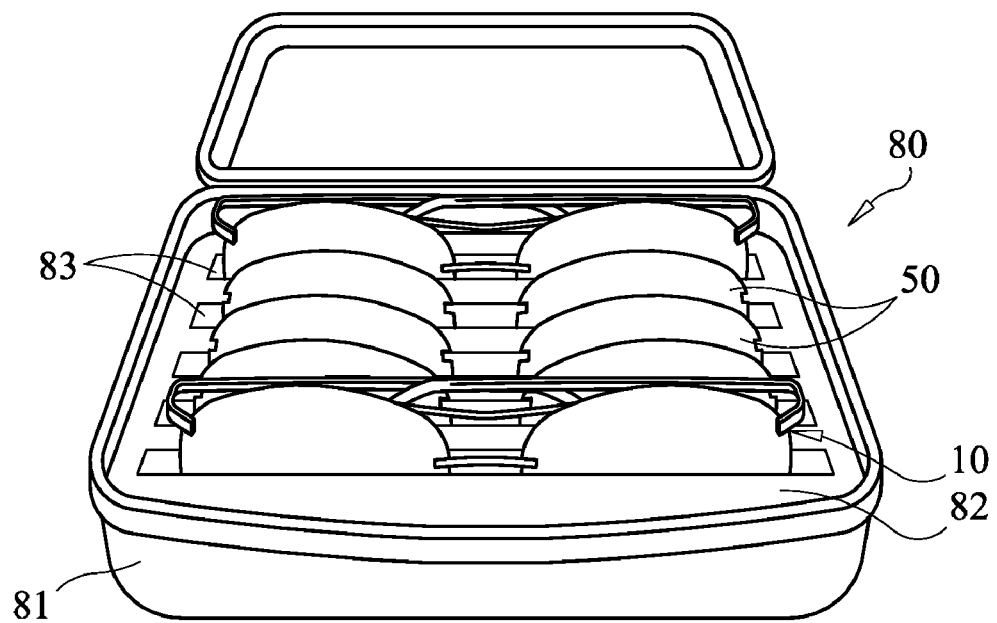
FIG. 4 is perspective view of a case containing a replaceable-lens eyewear kit, including frames and a plurality of interchangeable lenses.

As depicted in FIG. 4, a case 80 having a rigid or semi-rigid exterior 81, padded interior 82, and predetermined storage recessions 83 therein is optionally used to store at least one set of eyewear 10 and a plurality of interchangeable lenses 50. The case is especially helpful for the marketing and safekeeping of a kit with lenses 50 in a wide variety of colors. The exterior 81 may be waterproof, and the padding on the interior 82 should protect its contents from scratching or breaking, with the storage recessions 83 being pockets or slots specifically sized for the eyewear 10 and lenses 50. The interior 82 may be made of a manufactured solid foam. The case 80 is hinged in one embodiment, and a zipper, snap button, clip, hook-and-loop device, or other fastener may be employed for securely closing the case 80.

While the invention has been illustrated and described in detail in the foregoing drawings and description, the same is to be considered as illustrative and not restrictive in character, it being understood that only illustrative embodiments thereof have been shown and described and that all changes and modifications which are within the scope of the claimed subject matter are desired to be protected.

What is claimed is:

1. Eyewear having replaceable lenses, comprising:
    an eyewear frame;
    two temples;
    temple-connecting members extending outwardly from the frame and affixing the temples to opposing ends of the frame;
    a nose bridge;
    nose bridge-connecting members extending outwardly from two points centrally located on the frame and affixing the nose bridge to the frame;
    nose pads at two opposing points on the frame; and
    a plurality of interchangeable lenses, each of the lenses being made of pliable, transparent material and having a perimeter defining at least two recesses;
    whereby the recesses in the lenses are capable of engaging the temple-connecting members and the nose bridge-connecting members, thereby securing the lenses to the frame, or disengaging the temple-connecting members and the nose bridge-connecting members, thereby allowing removal of the lenses from the frame.

2. The eyewear of claim 1 wherein the lenses are sunglass lenses.

3. The eyewear of claim 1 wherein the lenses are polarized.

4. The eyewear of claim 1 wherein the lenses are prescription lenses.

5. The eyewear of claim 1 wherein the lenses are capable of flexing along their horizontal axis.

6. The eyewear of claim 1 further comprising a plurality of interchangeable lenses of varying tints of color.

7. The eyewear of claim 1 wherein the lens recesses are collinear.

8. The eyewear of claim 1 wherein the perimeter of the frame generally defines two half ovals or two semi-circles.

9. The eyewear of claim 1 wherein the perimeter of the frame generally defines two full ovals or two full circles.

10. The eyewear of claim 8 or 9 further comprising a generally horizontal bar connecting the half ovals, semi-circles, full ovals, or full circles defined by the frame.

11. The eyewear of claim 1 wherein the nose bridge, the nose bridge-connecting members, and the temple-connecting members extend away from a wearer of the eyewear.

12. The eyewear of claim 1 further comprising a case having a protective interior with recesses for receiving the eyewear and a plurality of the lenses.

* * * * *